US 10,145,246 B2

(12) United States Patent
Lewis et al.

(10) Patent No.: US 10,145,246 B2
(45) Date of Patent: Dec. 4, 2018

(54) STAGGERED CROSSOVERS FOR AIRFOILS

(71) Applicant: United Technologies Corporation, Hartford, CT (US)

(72) Inventors: Scott D. Lewis, Vernon, CT (US); Yafet Girma, Hartford, CT (US); Christopher Corcoran, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 498 days.

(21) Appl. No.: 14/820,786

(22) Filed: Aug. 7, 2015

(65) Prior Publication Data

US 2016/0160657 A1    Jun. 9, 2016

Related U.S. Application Data

(60) Provisional application No. 62/045,583, filed on Sep. 4, 2014.

(51) Int. Cl.
*F01D 5/18* (2006.01)
*F01D 9/04* (2006.01)
(Continued)

(52) U.S. Cl.
CPC ............... *F01D 5/187* (2013.01); *B22C 9/10* (2013.01); *F01D 5/147* (2013.01); *F01D 9/041* (2013.01);
(Continued)

(58) Field of Classification Search
CPC .......... F01D 5/186; F01D 5/187; F01D 5/188; F01D 5/18; F01D 5/147; F01D 9/065
See application file for complete search history.

(56) References Cited

U.S. PATENT DOCUMENTS 4,080,095 A    3/1978  Stahl
5,246,340 A    9/1993  Winstanley et al.
(Continued)

FOREIGN PATENT DOCUMENTS

WO    2012036850    3/2012

OTHER PUBLICATIONS

European Search Report for European Patent Application No. 15183628 completed Jan. 28, 2016.

*Primary Examiner* — Logan Kraft
*Assistant Examiner* — John S Hunter
(74) *Attorney, Agent, or Firm* — Carlson, Gaskey & Olds, P.C.

(57) ABSTRACT

An airfoil according to an exemplary aspect of the present disclosure includes, among other things, an airfoil section having an external wall and an internal wall. The internal wall defines a first reference plane extending in a spanwise direction and through a thickness of the internal wall. A first cavity and a second cavity are separated by the internal wall. A plurality of crossover passages within the internal wall connects the first cavity to the second cavity. Each of the plurality of crossover passages defines a passage axis. The plurality of crossover passages are distributed in the spanwise direction and arranged such that the passage axis of each of the plurality of cooling passages intersects a surface of the second cavity. The plurality of crossover passages include a first set of crossover passages and a second set of crossover passages positioned on opposite sides of the first reference plane. The passage axis of each of the first set of crossover passages is arranged at a first vertical angle relative to a spanwise axis, and the passage axis of each of the second set of crossover passages is arranged at a second, different vertical angle relative to the spanwise axis. A casting core for an airfoil is also disclosed.

21 Claims, 9 Drawing Sheets

(51) Int. Cl.
*F01D 5/14* (2006.01)
*F01D 25/12* (2006.01)
*B22C 9/10* (2006.01)

(52) U.S. Cl.
CPC .......... *F01D 25/12* (2013.01); *F05D 2220/32* (2013.01); *F05D 2230/21* (2013.01); *F05D 2230/211* (2013.01); *F05D 2250/314* (2013.01); *F05D 2260/201* (2013.01); *F05D 2260/202* (2013.01); *Y02T 50/672* (2013.01); *Y02T 50/673* (2013.01); *Y02T 50/676* (2013.01)

(56) References Cited

U.S. PATENT DOCUMENTS

| | | | |
|---|---|---|---|
| 5,263,820 | A | 11/1993 | Tubbs |
| 6,206,638 | B1 | 3/2001 | Glynn et al. |
| 6,837,683 | B2 | 1/2005 | Dailey |
| 7,063,506 | B2 | 6/2006 | Davison et al. |
| 7,273,350 | B2 | 9/2007 | Kopmels et al. |
| 7,722,326 | B2 | 5/2010 | Beeck et al. |
| 8,092,175 | B2 | 1/2012 | Beeck et al. |
| 8,317,474 | B1 | 11/2012 | Liang |
| 8,657,576 | B2 | 2/2014 | Tibbott et al. |
| 8,920,111 | B2 * | 12/2014 | Lee .......... F01D 5/187 415/115 |
| 2005/0135932 | A1 | 6/2005 | Dodd |
| 2011/0171023 | A1 | 7/2011 | Lee |
| 2014/0193273 | A1 | 7/2014 | Bommanakatte et al. |

\* cited by examiner

STAGGERED CROSSOVERS FOR AIRFOILS

CROSS-REFERENCE TO RELATED APPLICATION

The present disclosure claims priority to U.S. Provisional Patent Application No. 62/045,583, filed Sep. 4, 2014.

STATEMENT REGARDING FEDERALLY SPONSORED RESEARCH OR DEVELOPMENT

This invention was made with government support under Contract No. FA8650-09-D-2923-0021, awarded by the United States Air Force. The Government has certain rights in this invention.

BACKGROUND

This disclosure relates to impingement cooling for a component of a gas turbine engine.

Typical gas turbine engines include a fan delivering air into a bypass duct as propulsion air and to be utilized to cool components. The fan also delivers air into a core engine where it is compressed in a compressor. The compressed air is then delivered into a combustion section where it is mixed with fuel and ignited. Products of the combustion pass downstream over turbine rotors, driving them to rotate. In addition, static vanes are positioned adjacent to the turbine rotors to control the flow of the products of combustion.

The turbine rotors carry blades. The blades and the static vanes have airfoils extending from platforms. The blades and vanes are subject to extreme heat, and thus cooling schemes are utilized for each.

SUMMARY

An airfoil, according to an example of the present disclosure, includes an airfoil section having an external wall and an internal wall. The internal wall defines a first reference plane extending in a spanwise direction and through a thickness of the internal wall. A first cavity and a second cavity are separated by the internal wall. A plurality of crossover passages within the internal wall connects the first cavity to the second cavity. Each of the plurality of crossover passages defines a passage axis. The plurality of crossover passages are distributed in the spanwise direction and arranged such that the passage axis of each of the plurality of cooling passages intersects a surface of the second cavity. The plurality of crossover passages include a first set of crossover passages and a second set of crossover passages positioned on opposite sides of the first reference plane. The passage axis of each of the first set of crossover passages is arranged at a first vertical angle relative to a spanwise axis, and the passage axis of each of the second set of crossover passages is arranged at a second, different vertical angle relative to the spanwise axis.

In a further embodiment of any of the foregoing embodiments, the passage axis of each of the plurality of crossover passages defines an acute angle relative to the spanwise axis.

In a further embodiment of any of the foregoing embodiments, the first vertical angle extends radially inward relative to the spanwise axis, and the second vertical angle extends radially outward relative to the spanwise axis.

In a further embodiment of any of the foregoing embodiments, the first set of crossover passages and the second set of crossover passages are arranged such that a lateral projection of at least one of the first set of crossover passages onto the first reference plane intersects a lateral projection of at least one of the second set of crossover passages onto the first reference plane.

In a further embodiment of any of the foregoing embodiments, the internal wall defines a second reference plane perpendicular to the first reference plane, and the first set of crossover passages and the second set of crossover passages are arranged such that a spanwise projection of at least one of the first set of crossover passages onto the second reference plane intersects a spanwise projection of at least one of the second set of crossover passages onto the second reference plane.

In a further embodiment of any of the foregoing embodiments, the first set of crossover passages and the second set of crossover passages are spaced in the spanwise direction between an intermediate set of crossover passages, and a cross-sectional area of each of the intermediate set of crossover passages is different than a cross-sectional area of each of the first set of crossover passages and the second set of crossover passages.

In a further embodiment of any of the foregoing embodiments, the cross-sectional area of the each of the intermediate set of crossover passages is less than the cross-sectional area of the each of the first set of crossover passages and the second set of crossover passages.

In a further embodiment of any of the foregoing embodiments, the first cavity is configured to receive coolant from a second plurality of crossover passages.

In a further embodiment of any of the foregoing embodiments, the internal wall defines a second reference plane perpendicular to the first reference plane, and the second plurality of crossover passages includes a third set of crossover passages and a fourth set of crossover passages arranged such that a spanwise projection of each of the third set of crossover passages onto the second reference plane intersects a spanwise projection of at least one of the fourth set of crossover passages onto the second reference plane.

In a further embodiment of any of the foregoing embodiments, the second cavity is bounded by a trailing edge of the airfoil section.

In a further embodiment of any of the foregoing embodiments, the first cavity is spaced from the external wall.

In a further embodiment of any of the foregoing embodiments, the airfoil section extends from a platform section, the platform section defining at least one of the plurality of crossover passages.

In a further embodiment of any of the foregoing embodiments, at least two of the plurality of crossover passages are substantially aligned in the spanwise direction and are positioned on a common side of the first reference plane.

In a further embodiment of any of the foregoing embodiments, the second cavity is bounded by the external wall.

A casting core for an airfoil according to an example of the present disclosure includes a first portion corresponding to a first cavity of an airfoil and a second portion corresponding to a second cavity of the airfoil. Each of the first portion and the second portion extends in a spanwise direction along a first reference plane. A plurality of connectors couples the first portion and the second portion. The plurality of connectors corresponds to a plurality of crossover passages of the airfoil. Each of the plurality of connectors defines a first axis. The plurality of connectors are distributed in the spanwise direction. The plurality of connectors includes a first set of connectors and a second set of connectors positioned on opposite sides of the first reference plane. The first axis of each of the first set of connectors are arranged at a first vertical angle relative to a spanwise axis, and the first axis of each of the second set of connectors are arranged at a second, different vertical angle relative to the spanwise axis.

In a further embodiment of any of the foregoing embodiments, the first portion and the second portion extend in a chordwise direction along a second reference plane perpendicular to the first reference plane, and the first set of connectors and the second set of connectors are arranged such that a spanwise projection of each of the first set of connectors onto the second reference plane intersects a spanwise projection of at least one of the second set of connectors onto the second reference plane.

A gas turbine engine according to an example of the present disclosure includes a rotor and a vane spaced axially from the rotor. At least one of the rotor and the vane includes an airfoil section. The airfoil section includes an external wall and an internal wall defining a first reference plane extending in a spanwise direction. A first cavity and a second cavity are separated by the internal wall. A plurality of crossover passages is within the internal wall and connects the first cavity to the second cavity. Each of the plurality of crossover passages defines a passage axis. The plurality of crossover passages is distributed in the spanwise direction. The plurality of crossover passages includes a first set of crossover passages and a second set of crossover passages positioned on opposite sides of the first reference plane. The passage axis of each of the first set of crossover passages are arranged at a first vertical angle relative to a spanwise axis, and the passage axis of each of the second set of crossover passages are arranged at a second, different vertical angle relative to the spanwise axis.

In a further embodiment of any of the foregoing embodiments, the internal wall defines a second reference plane perpendicular to the first reference plane, and the first set of crossover passages and the second set of crossover passages are arranged such that a spanwise projection of at least one of the first set of crossover passages onto the second reference plane intersects a spanwise projection of at least one of the second set of crossover passages onto the second reference plane.

In a further embodiment of any of the foregoing embodiments, the airfoil section extends from a platform section, the platform section defining at least one of the plurality of crossover passages.

In a further embodiment of any of the foregoing embodiments, the passage axis of each of the plurality of crossover passages defines an acute angle relative to the spanwise axis, and the first vertical angle extends radially inward relative to the spanwise axis, and the second vertical angle extends radially outward relative to the spanwise axis.

Although the different examples have the specific components shown in the illustrations, embodiments of this disclosure are not limited to those particular combinations. It is possible to use some of the components or features from one of the examples in combination with features or components from another one of the examples.

The various features and advantages of this invention will become apparent to those skilled in the art from the following detailed description of an embodiment. The drawings that accompany the detailed description can be briefly described as follows.

DETAILED DESCRIPTION

Figure 1:
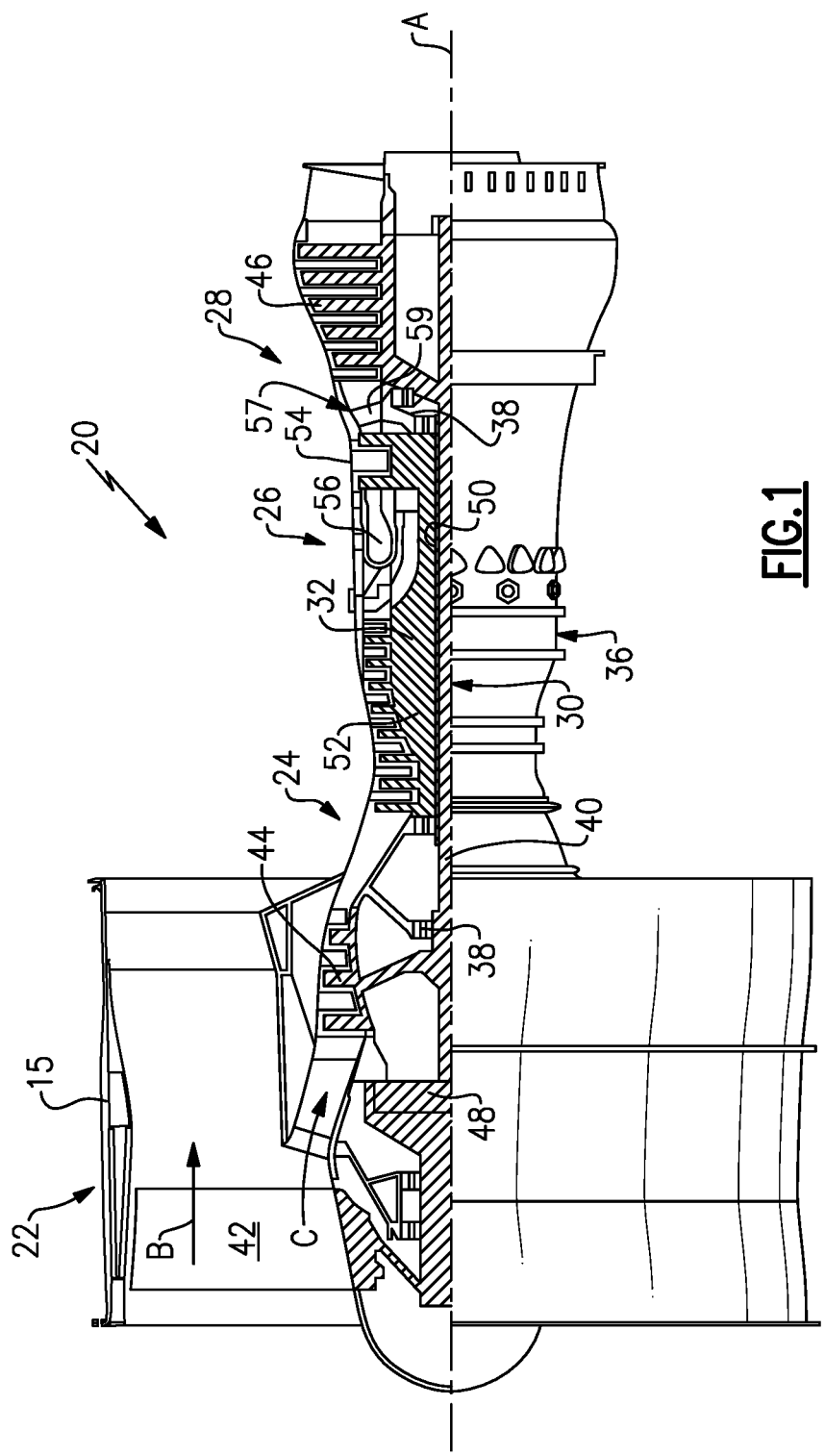
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

Figure 2:
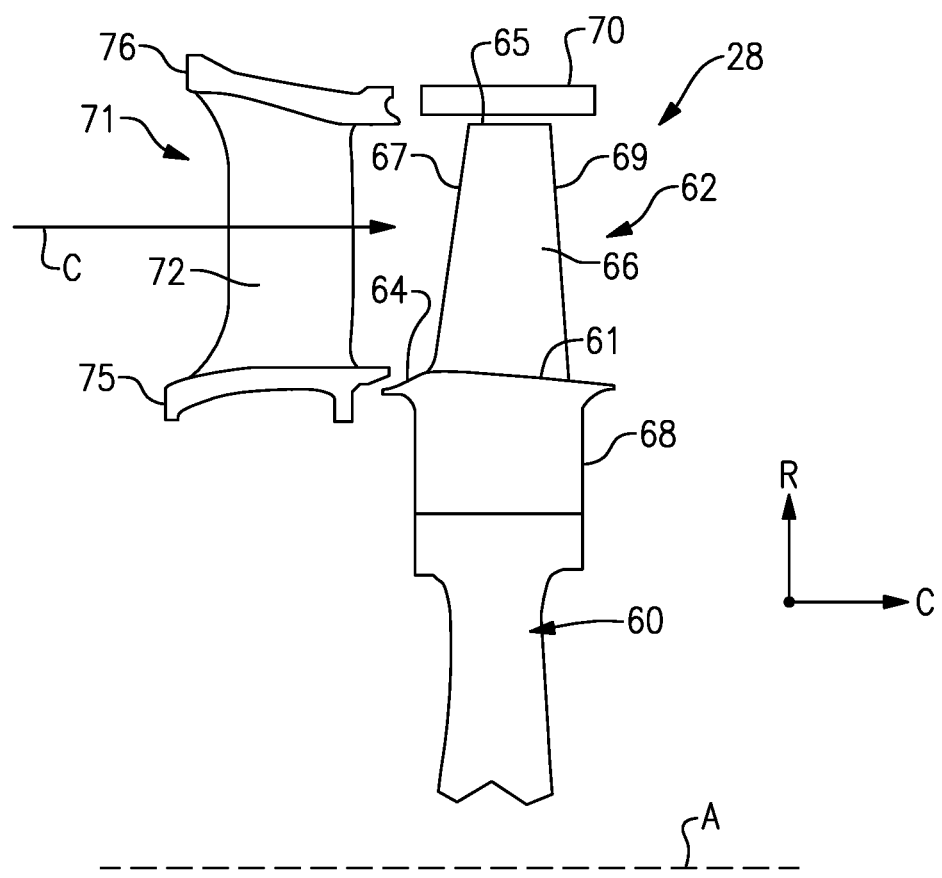
FIG. 2 schematically shows an airfoil arrangement for a turbine section.

FIG. 2 shows selected portions of the turbine section 28 including a rotor 60 carrying one or more airfoils 62 for rotation about the central axis A. In this disclosure, like reference numerals designate like elements where appropriate and reference numerals with the addition of one-hundred or multiples thereof designate modified elements that are understood to incorporate the same features and benefits of the corresponding original elements. In this example, each airfoil 62 includes a platform 64 and an airfoil section 66 extending in a radial direction R from the platform 64 to a tip 65. The airfoil section 66 generally extends in a chordwise direction C between a leading edge 67 to a trailing edge 69. A root section 68 of the airfoil 62 is mounted to the rotor 60, for example. It should be understood that the airfoil 62 can alternatively be integrally formed with the rotor 60, which is sometimes referred to as an integrally bladed rotor (IBR). A blade outer air seal (BOAS) 70 is spaced radially outward from the tip 65 of the airfoil section 66. A vane 71 is positioned along the engine axis A and adjacent to the airfoil 62. The vane 71 includes an airfoil section 72 extending between an inner platform 75 and an outer platform 76 to define a portion of the core flow path C. The turbine section 28 includes multiple airfoils 62, vanes 71, and blade outer air seals 70 arranged circumferentially about the engine axis A.

Figure 3A:
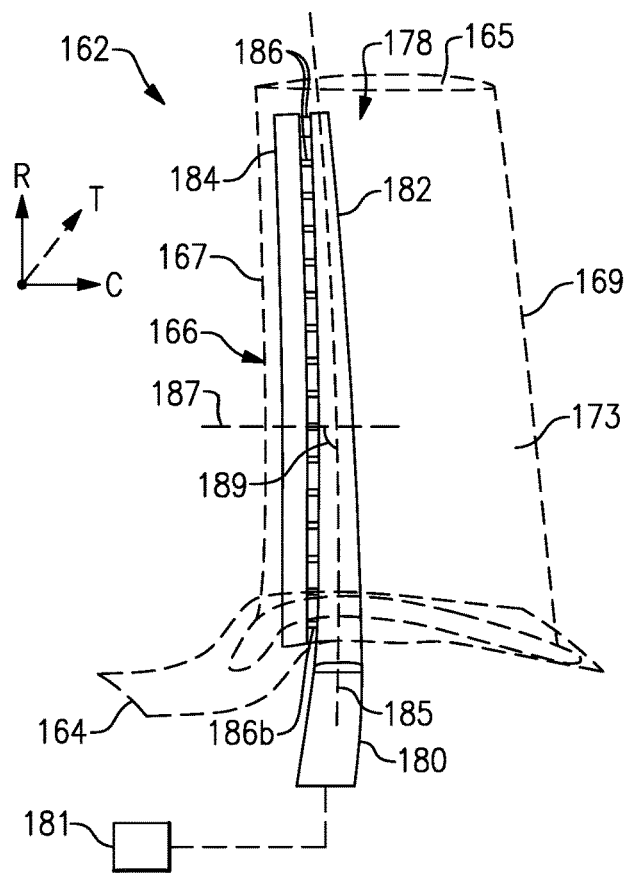
FIG. 3A illustrates a side view of a first embodiment of a cooling arrangement with an airfoil shown in phantom.
Figure 3B:
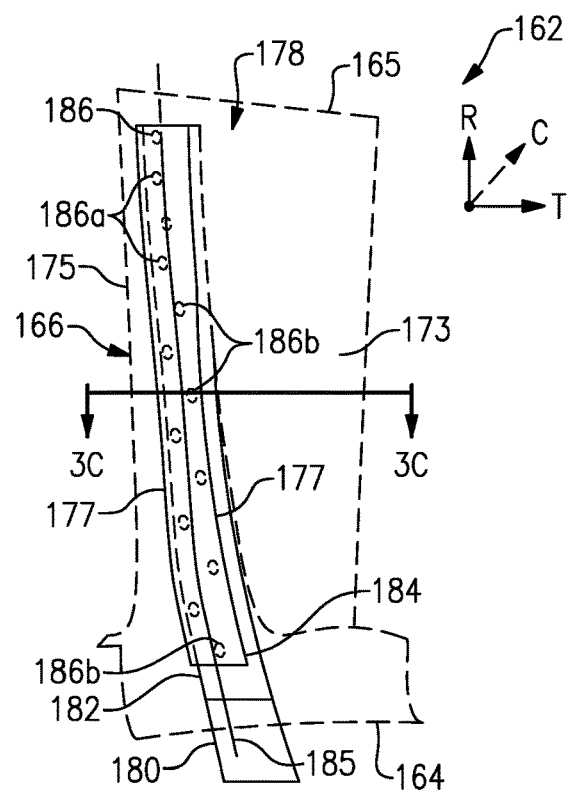
FIG. 3B illustrates a front view of the cooling arrangement of FIG. 3A.
Figure 3C:
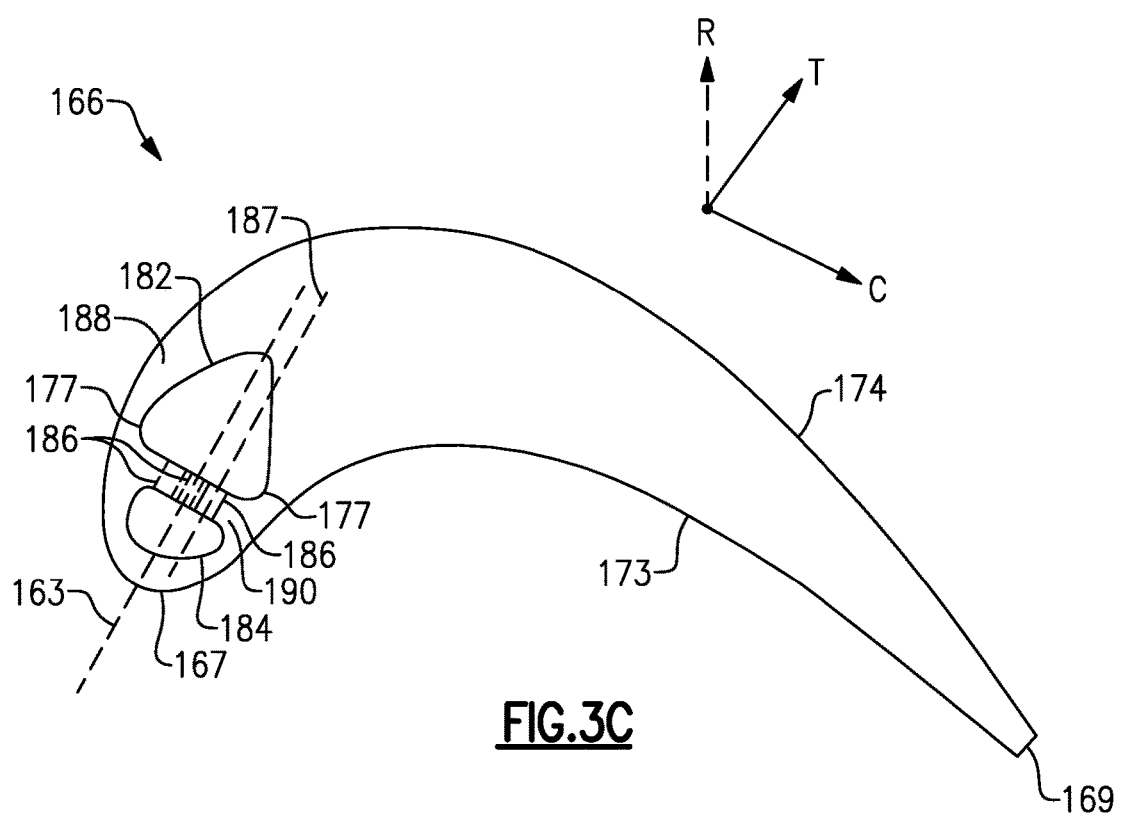
FIG. 3C illustrates a cross-sectional view of the cooling arrangement along line 3C-3C of FIG. 3A.

FIGS. 3A through 3C illustrate an exemplary cooling arrangement 178 for an airfoil 162. Although the exemplary cooling arrangements discussed in the disclosure refer to an airfoil, it should be appreciated that other components can benefit from the teachings described herein, including BOAS 70, components within other sections of the engine 20 formed with a core and other systems such as ground-based systems. Airfoil 162 is illustrated as a turbine airfoil, such as airfoil 62, but the teachings herein can also be utilized for vane 71 or another portion of the engine 20. At least one radial cooling passage 180 (only one shown for illustrative purposes) is provided between pressure and suction sides 173, 174 in a thickness direction T which is generally perpendicular to a chordwise direction C. Each radial cooling passage 180 extends from a root section through the platform 164 and toward the tip 165 to communicate coolant to various portions of the airfoil 162. An exterior surface of the airfoil 162 may include multiple film cooling holes (not shown) in fluid communication with the radial cooling passages 180 to provide film cooling to various surfaces of the airfoil 162. Each radial passage 180 is configured to receive coolant from a coolant source 181 (shown schematically). In some examples, the coolant source 181 is bleed air from an upstream stage of the compressor section 24 or bypass air. Other coolant sources are contemplated, such as a secondary cooling system aboard the aircraft.

The cooling arrangement 178 includes a feeding cavity 182 (or one of a first cavity and a second cavity) and an impingement cavity 184 (or the other one of the first cavity and the second cavity) extending in a radial direction R. One of the radial passages 180 communicates coolant to the feeding cavity 182. The feeding cavity 182 defines a spanwise axis 185 extending generally in the radial direction R between lateral edges 177 of the feeding cavity 182. Rather, the spanwise axis 185 can have a curvilinear geometry as illustrated in FIG. 3B. In some examples, the reference plane extending through the spanwise axis 185 may include an axial twist about the spanwise axis 185 between platform 164 and the tip 165.

One or more crossover passages 186 are located within an internal wall 190 (shown in FIG. 3C) spacing the feeding cavity 182 and the impingement cavity 184. The internal wall 190 defines a reference plane extending in the spanwise or radial direction R along the spanwise axis 185 and through a thickness of the internal wall 190. The crossover passages 186 extend in a chordwise direction C to connect the feeding cavity 182 and the impingement cavity 184. Each of the crossover passages 186 defines a passage axis 187 arranged such that the passage axis 187 intersects a surface of the impingement cavity 184 and/or the feeding cavity 182. Each passage axis 187 defines a vertical angle 189 relative to the spanwise axis 185. The arrangement of the crossover passages 186 are such that coolant provided to the feeding cavity 182 is thereafter communicated to the impingement cavity 184 via the crossover passages 186. The coolant is communicated to the impingement cavity 184 to selectively provide impingement cooling to one or more external walls 188 of the airfoil 162.

The crossover passages 186 are staggered in the radial direction R about the spanwise axis 185, as shown in FIG. 3B. Rather, the plurality of crossover passages 186 includes a first set of crossover passages 186a and a second set of crossover passages 186b positioned in a thickness direction T on opposite sides of a first reference plane extending through the spanwise axis 185 in the chordwise direction C. The crossover passages 186 are shown having a uniform distribution in the radial direction R. In other examples, the airfoil 162 includes a non-uniform distribution of at least some of the crossover passages 186 in the radial direction R. The crossover passages 186 can be arranged in other locations of the airfoil 162, including at least one crossover passage 186b located radially below a radially outer surface 61 of the platform 164. In further examples, at least one crossover passage 186b is located radially below the platform 164 and within the root section 68.

As shown in FIG. 3C, which is a cross section of the airfoil section 166 taken along line 3C-3C, some of the crossover passages 186 can be arranged along a reference plane extending through the spanwise axis 185 and along a reference axis 163 defined by at least one of the feeding cavity 182 and the impingement cavity 184, while other crossover passages 186 can be offset or staggered relative to the reference plane. In other examples, each of the crossover passages 186 is staggered relative to the reference plane extending along the spanwise axis 185 and the reference axis 163. Although the crossover passages 186 are described herein as being staggered relative to the reference plane extending through the spanwise axis 185 in the radial direction, it should be understood that the crossover passages described herein can be staggered any direction relative to an airfoil, such as in the chordwise direction and/or thickness direction, in any manner disclosed herein.

Figure 4:
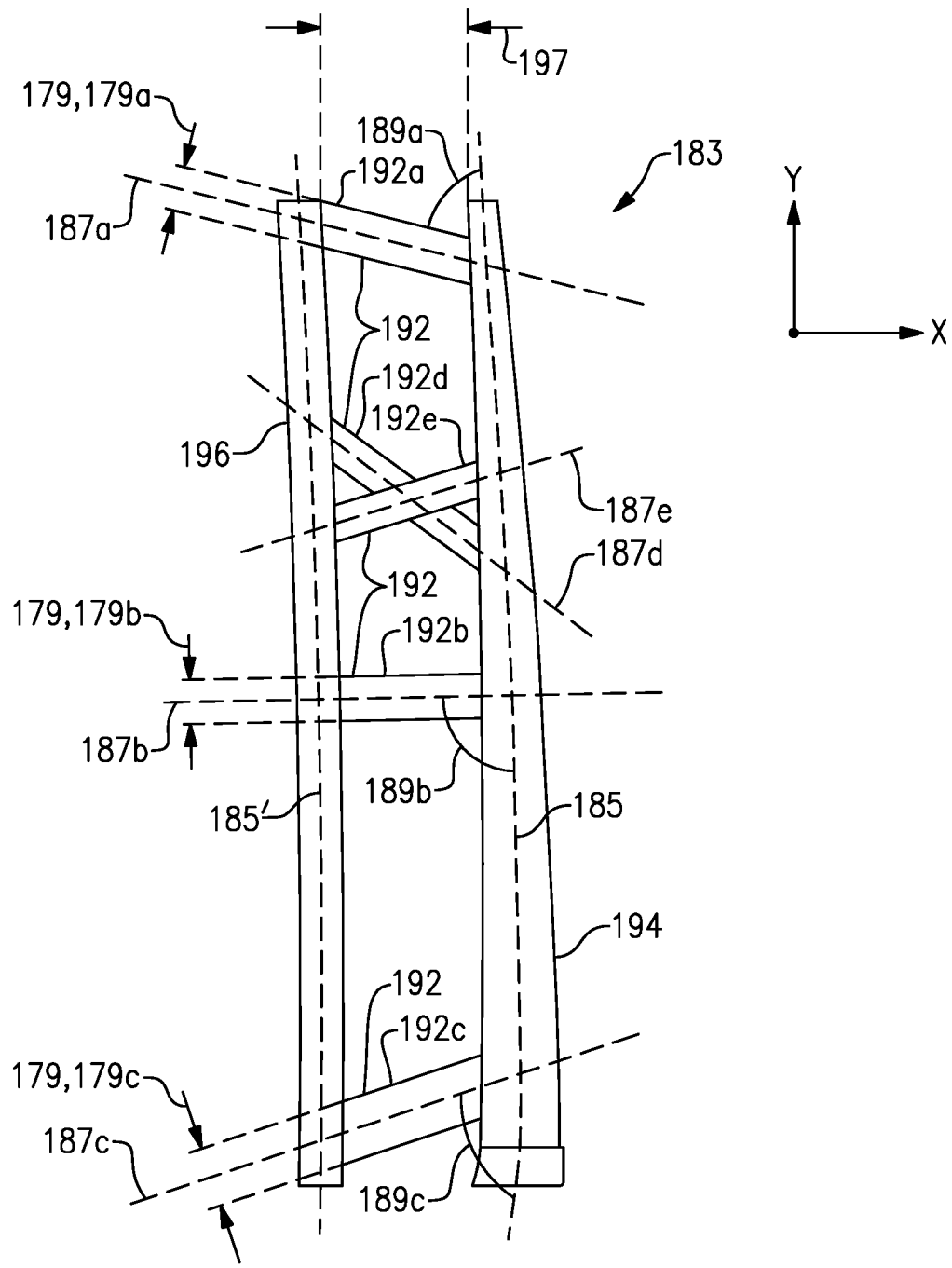
FIG. 4 illustrates a side view of a casting core corresponding to a cooling arrangement.

FIG. 4 illustrates a casting core 183 having various vertical arrangements corresponding to various cooling passages 186 of the cooling arrangement 178, for example. The casting core 183 includes a first portion 194 corresponding to the feeding cavity 182 and a second portion 196 corresponding to the impingement cavity 184, for example. In other examples, the first portion 194 corresponds to the impingement cavity 184, and the second portion 196 corresponds to the feeding cavity 182. Spanwise axis 185 is defined by the first portion 194 corresponding to the feeding cavity 182.

One or more crossover connectors 192, which correspond to the crossover passages 186, connect the first portion 194 and the second portion 196. The crossover connectors 192 cooperate with the first portion 194 and/or the second portion 196 to define an area of inertia generally along the spanwise axis 185. The first portion 194 and the second portion 196 are spaced apart in a direction of the axis X, or chordwise direction, to define a length 197 of the crossover connectors 192, which may vary between the first portion 194 and the second portion 196 in a direction of the axis Y, or spanwise direction. In some examples, axis X corresponds to the chordwise direction C of the airfoil 162, and axis Y corresponds to the radial direction R of the airfoil 162, although other spatial arrangements of the first portion 194, second portion 196 and crossover connectors 192 corresponding to an airfoil are contemplated. Three crossover connectors 192a, 192b, 192c corresponding to three crossover passages 186 of the cooling arrangement 178 are shown for illustrative purposes, although fewer or more than three crossover connectors 192 are contemplated.

Each of the crossover connectors 192 is arranged relative to the first portion 194 such that the passage axis 187 of the crossover connector 192 defines an angle 189 relative to the spanwise axis 185. Each of the crossover connectors 192 can define a different angle 189 relative to the spanwise axis 185. For example, the vertical angle 189c of the crossover connector 192c extends radially inward relative to the spanwise axis 185, and the vertical angle 189a of the crossover connector 192a extends radially outward relative to the spanwise axis 185, such that each of the vertical angles 189a, 189c defines an acute angle relative to the spanwise axis 185. In other examples, a difference between at least one of the vertical angles 189a, 189c and the spanwise axis 185 is between about 30° and about 150°. Crossover connector 192b is arranged such that the vertical angle 189b relative to the spanwise axis 185 is perpendicular or substantially perpendicular. It should be understood that any of the crossover passages 186 can be arranged to define a vertical angle 189 according to any of the crossover connectors 192a, 192b, 192c, and each of the crossover passages 186 can have the same or different vertical angles 189 relative to the spanwise axis 185. In other examples, the crossover connectors 192 are arranged relative to a spanwise axis 185' defined by the second portion 196, and utilizing similar techniques as described herein.

The vertical arrangement of the crossover connectors 192a, 192b, 192c can be utilized in combination with the staggering of the crossover passages 186 as illustrated in FIG. 3B. The combination of staggering and the vertical arrangement generally increases the length 197 of each of the crossover connectors 192 corresponding to the crossover passages 186, thereby increasing the convective cooling provided to portions of the airfoil 162 adjacent the crossover passages 186.

Crossover connectors 192d, 192e illustrate an arrangement corresponding to a pair of crossover passages 186 such that a lateral projection of the passage axis 187d of the first crossover connector 192d intersects a lateral projection of the passage axis 187e of the crossover connector 192e. The lateral projections of the passage axis 187d and 187e are relative to a reference plane extending along the X axis and the Y axis. The arrangement of the crossover connectors 192d, 192e can be utilized independent of, or in combination with, any of the arrangements illustrated by crossover connectors 192a, 192b and/or 192c, and with any of the crossover passages disclosed herein.

Each of the crossover connectors 192 defines a cross-sectional width 179 extending through a cross-section of the crossover connector 192. In some examples, the cross-sectional width 179 of each of the crossover connectors 192a, 192b, 192c is equal or substantially equal. In other examples, the cross-sectional width 179 of at least one of the crossover connectors 192a, 192b, 192c is different from at least one of the other crossover connectors 192a, 192b, 192c. This arrangement permits different convective cooling characteristics to portions of the airfoil adjacent the crossover passages 186 due to different cross-sectional areas of the crossover connectors 192.

Figure 5A:
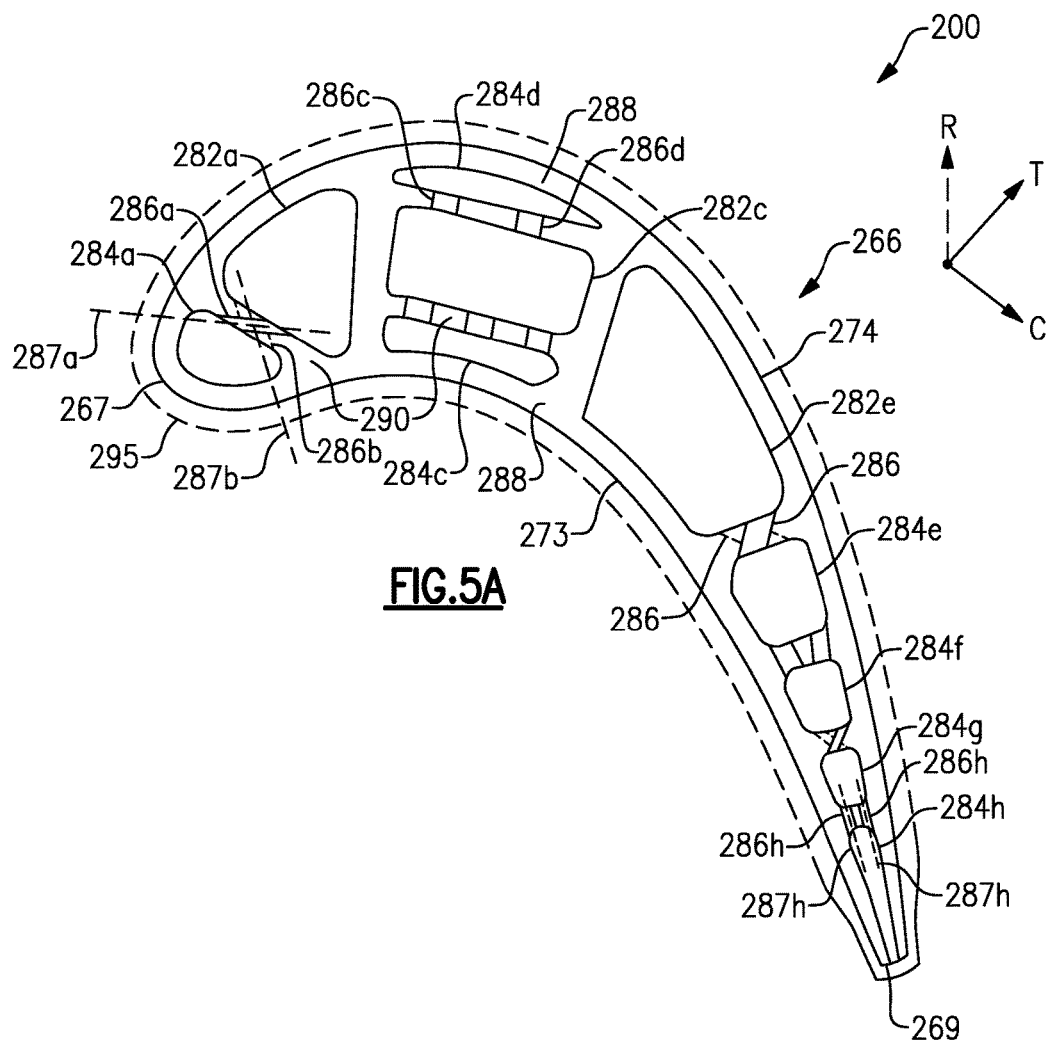
FIG. 5A illustrates a cross-sectional view of a second embodiment of a cooling arrangement for an airfoil.
Figure 5B:
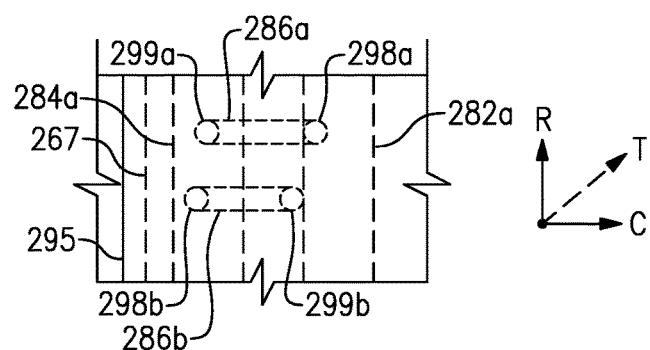
FIG. 5B illustrates a side view of a portion of the cooling arrangement of FIG. 5A.

FIG. 5A illustrates a cross-sectional top view of an embodiment 200 of an airfoil section 266 having various arrangements of crossover passages 286. As shown, airfoil section 266 includes at least one pair of crossover passages 286a, 286b configured to provide coolant from a feeding cavity 282a to an impingement cavity 284a located adjacent to a leading edge 267 of the airfoil section 266. The crossover passages 286a, 286b are arranged such that a spanwise projection of the passage axis 287a onto a second reference plane generally perpendicular to a first reference plane extending in the radial direction R (shown in FIG. 5B) intersects a spanwise projection of the passage axis 287b. Rather, the second reference plane generally extends in plane with the cross section of the airfoil section 266 shown in FIG. 5A. Similar to the arrangement of FIG. 3B, the crossover passages 286a, 286b are staggered in the radial direction as illustrated in FIG. 5B. Inlets 298a, 298b of the crossover passages 286a, 286b are spaced apart and staggered in the radial direction R, and outlets 299a, 299b of the crossover passages 286a, 286b are also staggered in the radial direction R. In other examples, either the inlets 298 or the outlets 299 are staggered in the radial direction R. This arrangement of the crossover passages 286a, 286b provides for an increased length of the crossover passages 286a, 286b compared to crossover passages arranged substantially perpendicular to the respective feeding cavity and/or impingement cavity, such as crossover passages 286c, 286d. As such, the internal surface area of the crossover passages 286a, 286b is increased, thereby, permitting additional heat transfer between the surfaces of the crossover passages 286a, 286b and adjacent portions of the airfoil, such as a leading edge 267 of the airfoil section 266 which may experience relatively higher temperatures than a trailing edge 269 of the airfoil section 266. It should be appreciated that the rigidity of the arrangement of the crossover passages 286a, 286b may be different than the rigidity of the crossover connectors forming the crossover passages 286c, 286d.

The airfoil section 266 can include multiple feeding cavities and impingement cavities to provide cooling to various portions of the airfoil section 266. For example, the airfoil section 266 includes a mid-feed cavity 282c spaced from the external walls 288 to provide coolant to a pair of impingement cavities 284c, 284d arranged adjacent to pressure side 273 and suction side 274 of the airfoil section 266, respectively, with crossover passages 286c, 286d staggered in the radial direction R similar to the crossover passages 186 shown in FIG. 3B. The airfoil section 266 can also include a series of feeding and impingement cavities arranged sequentially with respect to one another. For example, a first feeding cavity 282e is arranged with respect to a downstream set of impingement cavities 284e, 284f, 284g, 284h, with impingement cavity 284h bounded by the trailing edge 269 of the airfoil section 266.

In some examples, a thermal barrier coating (TBC) 295 is disposed on a surface of the airfoil section 266 to reduce heat transfer between the core airflow path C and the airfoil section 266. The thermal barrier coating 295 can be disposed on a surface of the airfoil section 266 utilizing various techniques, such as air plasma spraying or chemical vapor deposition. The thermal barrier coating 295 can be made of various materials such as ceramics, alumina, or zirconia, although other materials or composites are also contemplated. The thermal barrier coating 295 can taper from the leading edge 267 to the trailing edge 269 of the airfoil section 266 to provide a desired aerodynamic profile. Impingement cavity 284h can be fed by crossover passages 286h, in which the spanwise projection of each passage axis 287h does not intersect the other passage axis 287h. This arrangement permits coolant to be communicated at a relatively lower temperature than the arrangement of crossover passages 286a, 286b having intersecting spanwise projections, for example.

Figure 6:
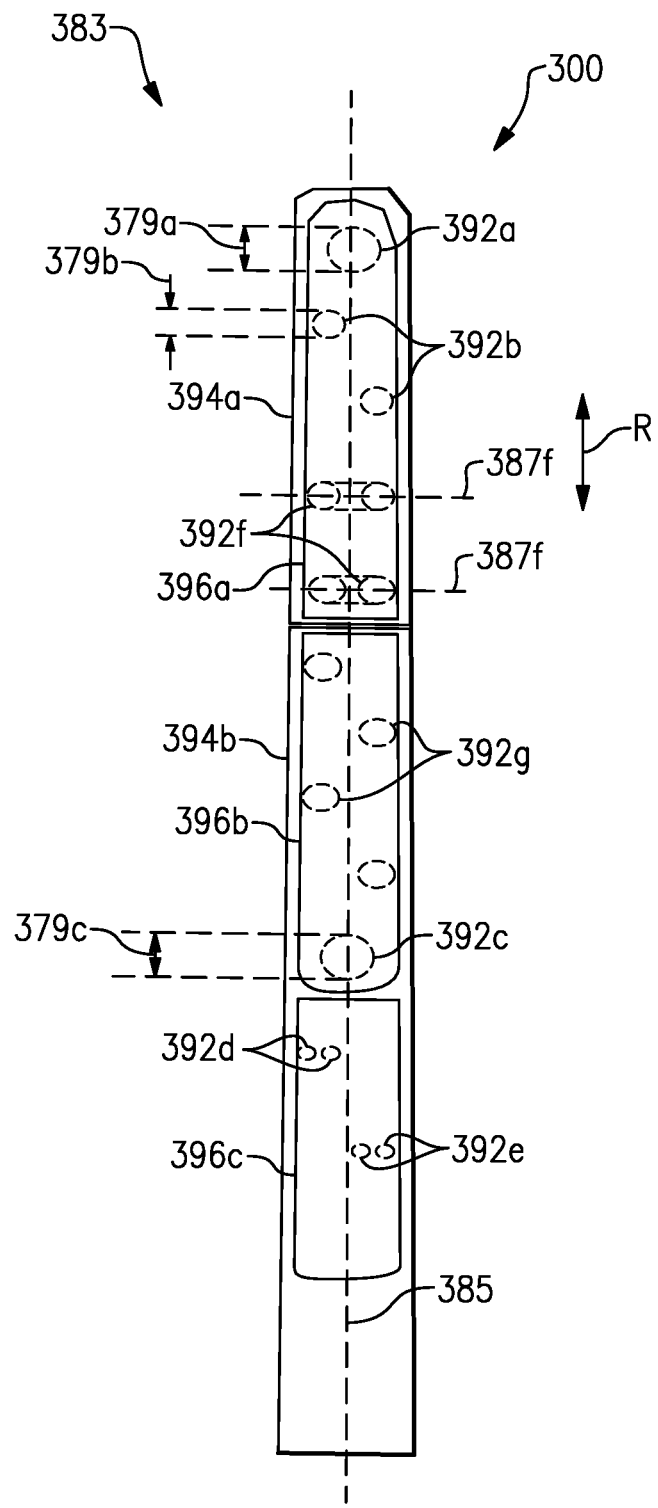
FIG. 6 illustrates a front view of a casting core corresponding to a third embodiment of a cooling arrangement.

FIG. 6 illustrates a front view of an embodiment 300 of a casting core 383 corresponding to a cooling arrangement. In this arrangement, the casting core 383 includes a plurality of crossover connectors 392 which can correspond to arrangements of the crossover passages 186, 286. The casting core 383 includes a first set of crossover connectors 392a and a second set of crossover connectors 392c spaced in the radial direction R between an intermediate set of crossover connectors 392b. As shown, a cross-sectional width 379b of each of the intermediate set of crossover connectors 392b is different than a cross-sectional width of at least one of the first set of crossover connectors 392a and the second set of crossover connectors 392c. Accordingly, a cross-sectional area of each of the intermediate set of crossover connectors 392b is different than a cross-sectional area of at least one of the first set of crossover connectors 392a and the second set of crossover connectors 392c. As shown, the cross-sectional width 379b of the intermediate set of crossover connectors 392b is less than a cross-sectional width of each of the first set and second set of crossover connectors 392a, 392c. In one example, a cross-sectional area of at least one of the first set and second set of crossover connectors 392a, 392c to a cross-sectional area of the intermediate set of crossover connectors 392b is less than or equal to about 2:1. However, other cross-sectional arrangements are contemplated herein.

In some examples, the casting core 383 can include at least two or more crossover connectors 392d connected to the first portion 394b and a second portion 396c. The crossover connectors 392d are positioned on a common side of a reference plane extending through the spanwise axis 385 and at substantially the same radial position along the spanwise axis 385. In further examples, one or more sets of crossover connectors, such as crossover connectors 392e, can be substantially aligned on an opposite side of the reference plane relative to the spanwise axis 385 and the crossover connectors 392d. It should be appreciated that the various combinations of any of the crossover connectors 392 can be utilized in any of the cooling arrangements disclosed herein.

The casting core 383 can include at least two first portions 394a, 394b and at least two second portions 396a, 396b extending in the radial direction R. In this configuration, the first portion 394a and the second portion 396a share a first set of crossover connectors 392f, and the first portion 394b and the second portion 396b share a second, different set of crossover connectors 392g. Of course, more than two first portions 394 and more than two second portions 396 can be utilized. As shown, the crossover connectors 392f are arranged such that a spanwise projection of each passage axis 387f intersects each other, similar to the arrangement of the crossover passages 286a, 286b of FIG. 5A, whereas a spanwise projection of each passage axis of the crossover connectors 392b do not intersect.

Figure 7:
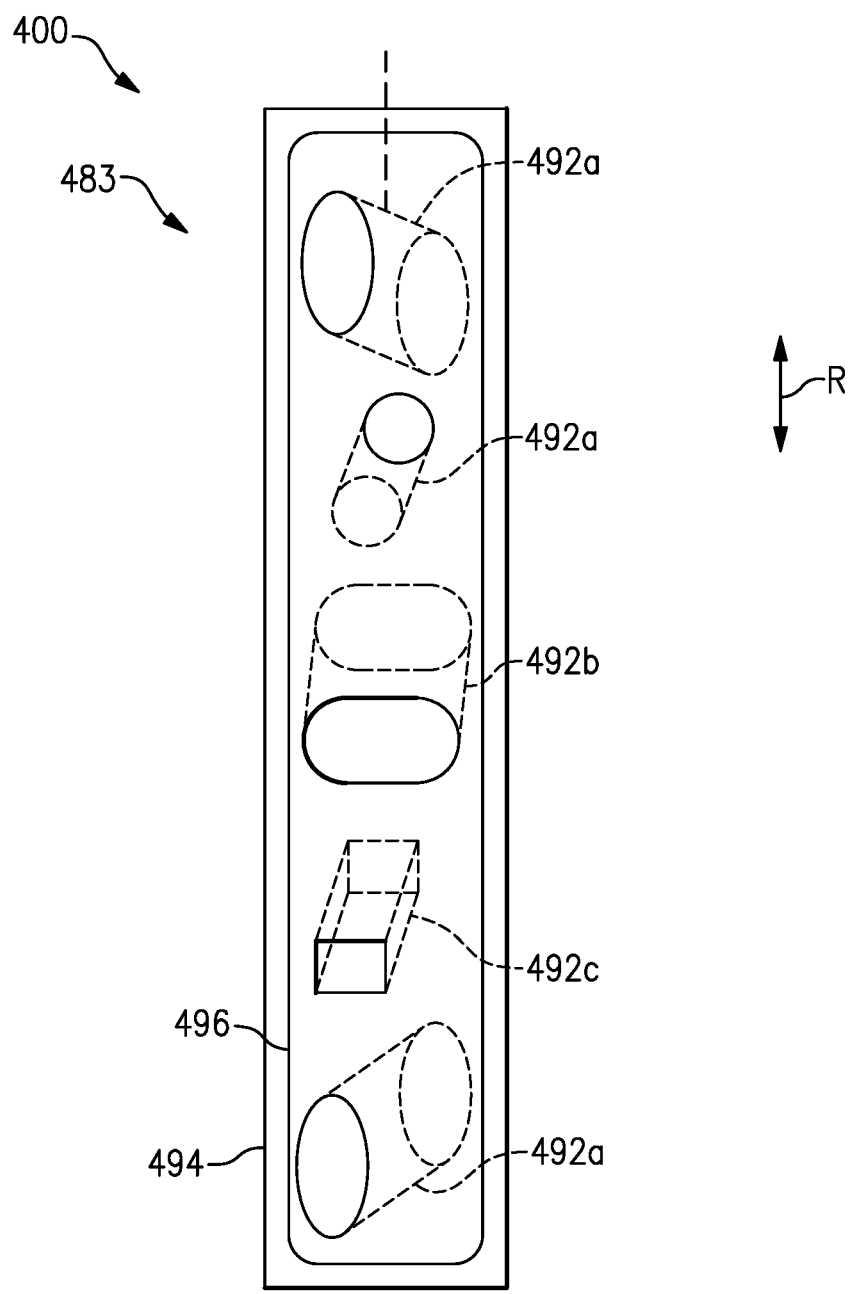
FIG. 7 illustrates a front view of a casting core corresponding to a fourth embodiment of a cooling arrangement.

FIG. 7 illustrates a front view of an embodiment 400 of a casting core 483 illustrating various geometries which can be utilized for any of the crossover passages disclosed herein. As shown, some of the crossover connectors, such as crossover connectors 492a, can have an elliptical cross-sectional profile. In other examples, the crossover connectors can have a racetrack-shaped geometry as illustrated by the crossover connector 492b. The crossover passages can also have a rectangular or quadrilateral geometry, such as that illustrated by crossover connector 492c. However, it should be appreciated that other geometries of the crossover connectors and crossover passages are contemplated herein. Any of the crossover connectors 492 can be staggered along a reference plane with respect to other crossover connectors in any manner disclosed herein.

Figure 8A:
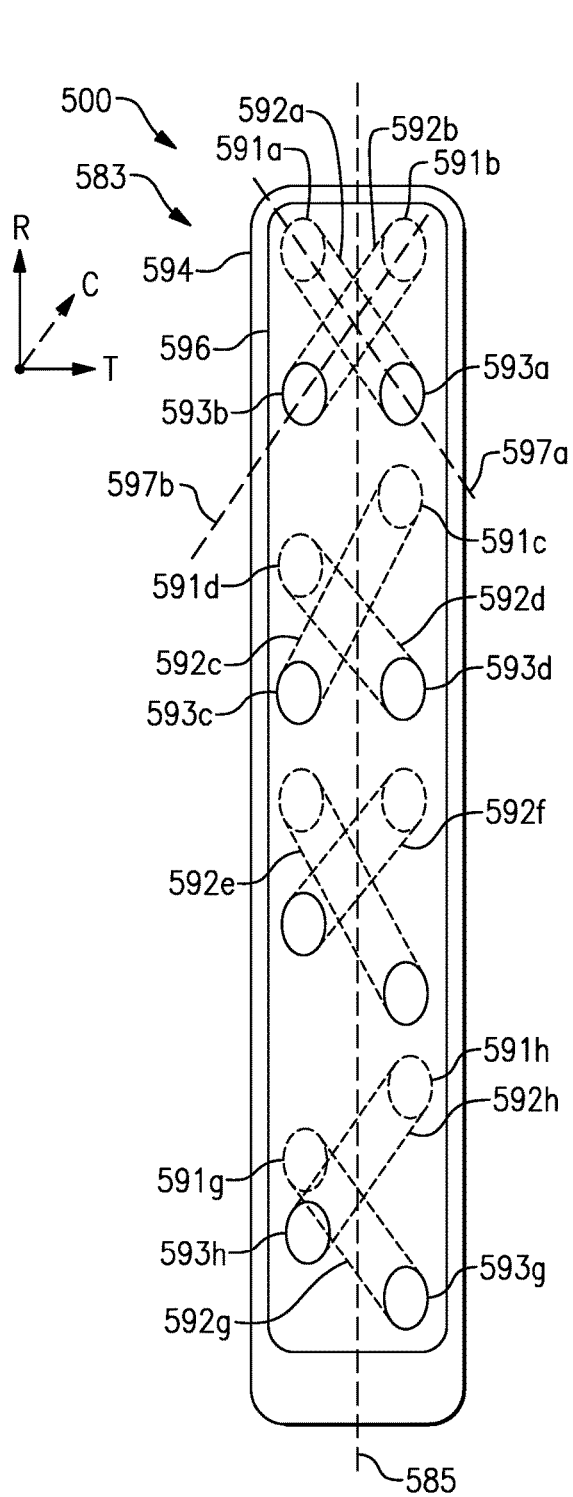
FIG. 8A illustrates a front view of a casting core corresponding to a fifth embodiment of a cooling arrangement.
Figure 8B:
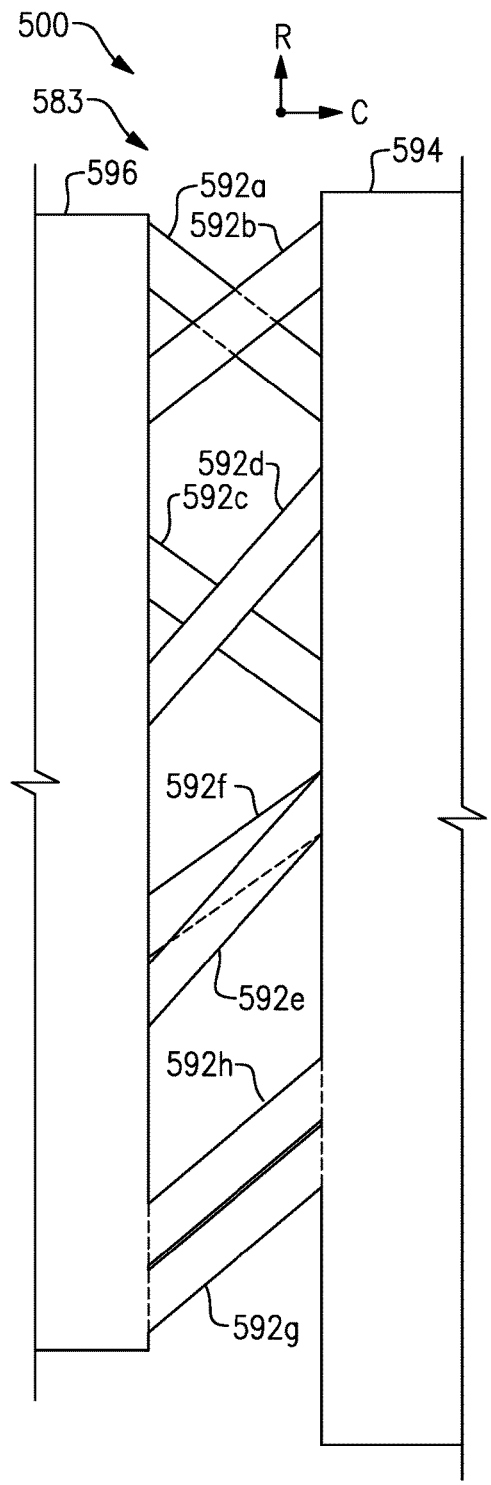
FIG. 8B illustrates a side view of the casting core of FIG. 8A.

FIGS. 8A and 8B illustrate an embodiment 500 of a casting core 583 illustrating various geometries corresponding to crossover passages wherein chordwise projections of the crossover connectors 592 intersect each other. The casting core 583 includes at least one pair of crossover connectors 592a, 592b having different radial and lateral orientations relative to a spanwise axis 585. The crossover connectors 592a, 592b are arranged to extend between first ends 591a, 591b attached to the first portion 594 and second ends 593a, 593b attached to the second portion 596. The first ends 591a, 591b and the second ends 593a, 593b correspond to respective and outlets of crossover passages disclosed herein. The first ends 591a, 591b are arranged at approximately the same radial position relative to the spanwise axis 585, and the second ends 593a, 593b are also arranged at approximately the same radial position such that a projection of passage axis 587a and 587b intersect each other when projected in the chordwise direction C. In this arrangement, crossover passages corresponding to the crossover connectors 592a, 592b are in fluid communication with each other at the area of intersection. However, the crossover connectors 592a, 592b may have a curved geometry such that the crossover connectors 592a, 592 do not intersect each other.

Other arrangements of the crossover connectors 592 are contemplated. In some examples, the casting core 583 includes at least one pair of crossover connectors 592c, 592d with first ends 591c, 591d staggered and second ends 593c, 593d at least substantially aligned in the radial direction R. In other examples, the casting core 583 includes at least one pair of crossover connectors 592e, 592f with first ends 591e, 591f at least substantially aligned and second ends 593e, 593f staggered in the radial direction R. In further examples, the casting core 583 includes at least one pair of crossover connectors 592g, 592h having first ends 591g, 593h and second ends 593g, 593h staggered relative to the spanwise axis 585. The arrangement of the various crossover connectors 592 can further increase a length corresponding to the crossover connectors to provide additional surface area and enhanced heat transfer characteristics.

Although particular step sequences are shown, described, and claimed, it should be understood that steps may be performed in any order, separated or combined unless otherwise indicated and will still benefit from the present disclosure.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An airfoil, comprising:
   an airfoil section having an external wall and an internal wall, said internal wall defining a first reference plane extending in a spanwise direction and through a thickness of said internal wall;
   a first cavity and a second cavity separated by said internal wall;
   a plurality of crossover passages within said internal wall and connecting said first cavity to said second cavity, each of said plurality of crossover passages defining a passage axis, said plurality of crossover passages distributed in said spanwise direction and arranged such that said passage axis of each of said plurality of cooling passages intersects a surface of said second cavity, and said passage axis extending through said first reference plane;
   wherein said plurality of crossover passages includes a first set of crossover passages and a second set of crossover passages, said first set of crossover passages including a first set of outlets and said second set of crossover passages including a second set of outlets defined along surfaces of said internal wall defining said second cavity, said first and second sets of outlets positioned on opposite sides of said first reference plane, said passage axis of each of said first set of crossover passages being arranged at a first vertical angle relative to a spanwise axis and said passage axis of each of said second set of crossover passages being arranged at a second, different vertical angle relative to said spanwise axis; and
   wherein said internal wall defines a second reference plane perpendicular to said first reference plane, and said first set of crossover passages and said second set of crossover passages are arranged such that a spanwise projection of said passage axis of at least one of said first set of crossover passages onto said second reference plane intersects a spanwise projection of said passage axis of at least one of said second set of crossover passages onto said second reference plane.

2. The airfoil as recited in claim 1, wherein said passage axis of each of said plurality of crossover passages defines an acute angle relative to said spanwise axis.

3. The airfoil as recited in claim 1, wherein said first vertical angle extends radially inward relative to said spanwise axis, and said second vertical angle extends radially outward relative to said spanwise axis.

4. The airfoil as recited in claim 3, wherein said first set of crossover passages and said second set of crossover passages are arranged such that a lateral projection of said passage axis of at least one of said first set of crossover passages onto said first reference plane intersects a lateral projection of said passage axis of at least one of said second set of crossover passages onto said first reference plane.

5. The airfoil as recited in claim 4, wherein:
   said opposite sides include a first side of said first reference plane and a second side of said first reference plane, said first set of crossover passages positioned on said first side, and said second set of crossover passages positioned on said second side; and
   wherein said first set of outlets of said first set of crossover passages are offset in said spanwise direction relative to outlets of each and every crossover passage located on said second side.

6. The airfoil as recited in claim 5, wherein inlets of said first set of crossover passages are offset in said spanwise direction relative to inlets of said each and every crossover passage.

7. The airfoil as recited in claim 6, wherein said second cavity is bounded by a leading edge of said airfoil section.

8. The airfoil as recited in claim 1, wherein said first set of crossover passages and said second set of crossover passages are spaced in said spanwise direction between an intermediate set of crossover passages, and a cross-sectional area of each of said intermediate set of crossover passages is different than a cross-sectional area of each of said first set of crossover passages and said second set of crossover passages.

9. The airfoil as recited in claim 8, wherein said cross-sectional area of said each of said intermediate set of crossover passages is less than said cross-sectional area of said each of said first set of crossover passages and said second set of crossover passages.

10. The airfoil as recited in claim 1, wherein said first cavity is configured to receive coolant from a second plurality of crossover passages.

11. The airfoil as recited in claim 10, wherein said second plurality of crossover passages includes a third set of crossover passages and a fourth set of crossover passages arranged such that a spanwise projection of said passage axis of each of said third set of crossover passages onto said second reference plane intersects a spanwise projection of said passage axis of at least one of said fourth set of crossover passages onto said second reference plane.

12. The airfoil as recited in claim 11, wherein said second cavity is bounded by a trailing edge of said airfoil section.

13. The airfoil as recited in claim 1, wherein said first cavity is spaced from said external wall.

14. The airfoil as recited in claim 1, wherein said airfoil section extends from a platform section, said platform section defining at least one of said plurality of crossover passages.

15. The airfoil as recited in claim 1, wherein at least two of said plurality of crossover passages are aligned in said spanwise direction and are positioned on a common side of said first reference plane.

16. The airfoil as recited in claim 1, wherein said second cavity is bounded by said external wall.

17. A casting core for an airfoil, comprising:
a first portion corresponding to a first cavity of an airfoil and a second portion corresponding to a second cavity of the airfoil, each of said first portion and said second portion extending in a spanwise direction along a first reference plane;
a plurality of connectors coupling said first portion and said second portion, said plurality of connectors corresponding to a plurality of crossover passages of the airfoil, each of said plurality of connectors defining a first axis, said plurality of connectors being distributed in said spanwise direction, and said first axis extending through said first reference plane;
wherein said plurality of connectors includes a first set of connectors and a second set of connectors, said first set of connectors including a first set of ends and said second set of connectors including a second set of ends defined along said second portion and corresponding to outlets of the plurality of crossover passages, said first and second sets of ends positioned on opposite sides of said first reference plane, said first axis of each of said first set of connectors arranged at a first vertical angle relative to a spanwise axis, and said first axis of each of said second set of connectors arranged at a second, different vertical angle relative to said spanwise axis; and
wherein said first portion and said second portion extend in a chordwise direction along a second reference plane perpendicular to said first reference plane, and said first set of connectors and said second set of connectors are arranged such that a spanwise projection of said first axis of each of said first set of connectors onto said second reference plane intersects a spanwise projection of said first axis of at least one of said second set of connectors onto said second reference plane.

18. A gas turbine engine, comprising:
a rotor carrying an airfoil, and a vane spaced axially from said rotor, and
wherein at least one of said airfoil and said vane includes an airfoil section, said airfoil section comprising:
an external wall and an internal wall defining a first reference plane extending in a spanwise direction;
a first cavity and a second cavity separated by said internal wall;
a plurality of crossover passages within said internal wall and connecting said first cavity to said second cavity, each of said plurality of crossover passages defining a passage axis, said plurality of crossover passages distributed in said spanwise direction, and said passage axis extending through said first reference plane; and
wherein said plurality of crossover passages includes a first set of crossover passages and second set of crossover passages, said first set of crossover passages including a first set of outlets and said second set of crossover passages including a second set of outlets defined along surfaces of said internal wall defining said second, cavity, said first set of outlets positioned on a first side of said first reference plane and a second set of outlets positioned on a second, opposed side of said first reference plane, said passage axis of each of said first set of crossover passages being arranged at a first vertical angle relative to a spanwise axis, said passage axis of each of said second set of crossover passages being arranged at a second, different vertical angle relative to said spanwise axis, with said first set of outlets of said first set of crossover passages offset in said spanwise direction relative to outlets of each and every crossover passage located on said second side.

19. The gas turbine engine as recited in claim 18, wherein said internal wall defines a second reference plane perpendicular to said first reference plane, and said first set of crossover passages and said second set of crossover passages are arranged such that a spanwise projection of at least one of said first set of crossover passages onto said second reference plane intersects a spanwise projection of at least one of said second set of crossover passages onto said second reference plane.

20. The gas turbine engine as recited in claim 18, wherein said airfoil section extends from a platform section, said platform section defining at least one of said plurality of crossover passages.

21. The gas turbine engine as recited in claim 18, wherein said passage axis of each of said plurality of crossover passages defines an acute angle relative to said spanwise axis, and said first vertical angle extends radially inward relative to said spanwise axis, and said second vertical angle extends radially outward relative to said spanwise axis.

* * * * *